A. SUNDH.
ALTERNATING CURRENT MOTOR CONTROLLING APPARATUS.
APPLICATION FILED OCT. 31, 1908.
1,012,477.
Patented Dec. 19, 1911.
4 SHEETS—SHEET 4.
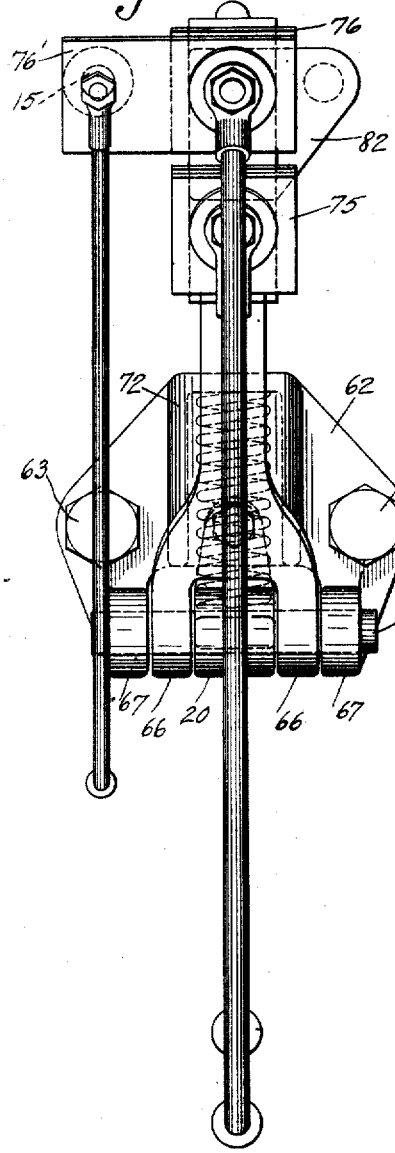
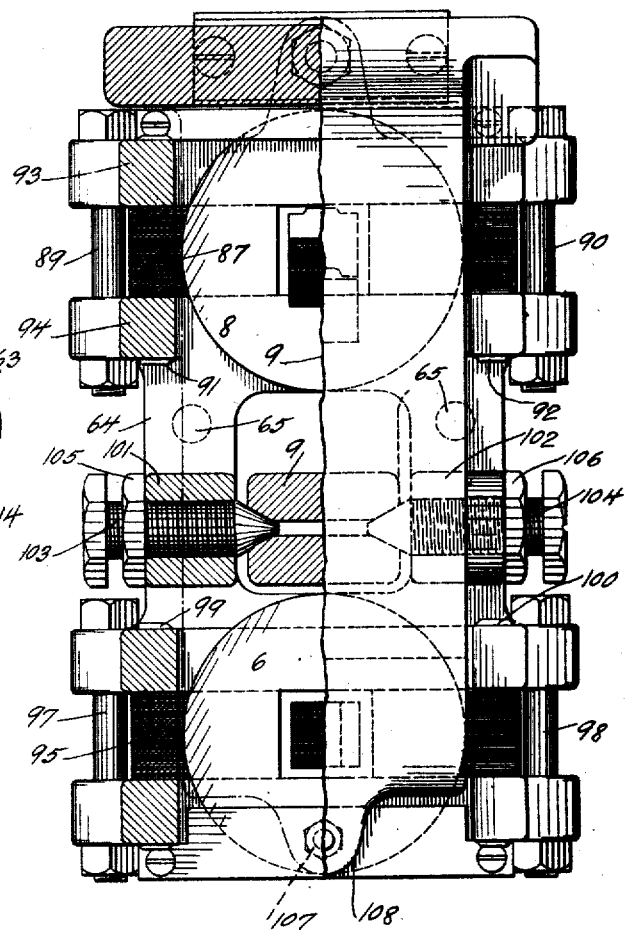
Witnesses:
Arthur C Mason
Ernest S. Gale Jr.
August Sundh Inventor
By Attorney J. F. Rule

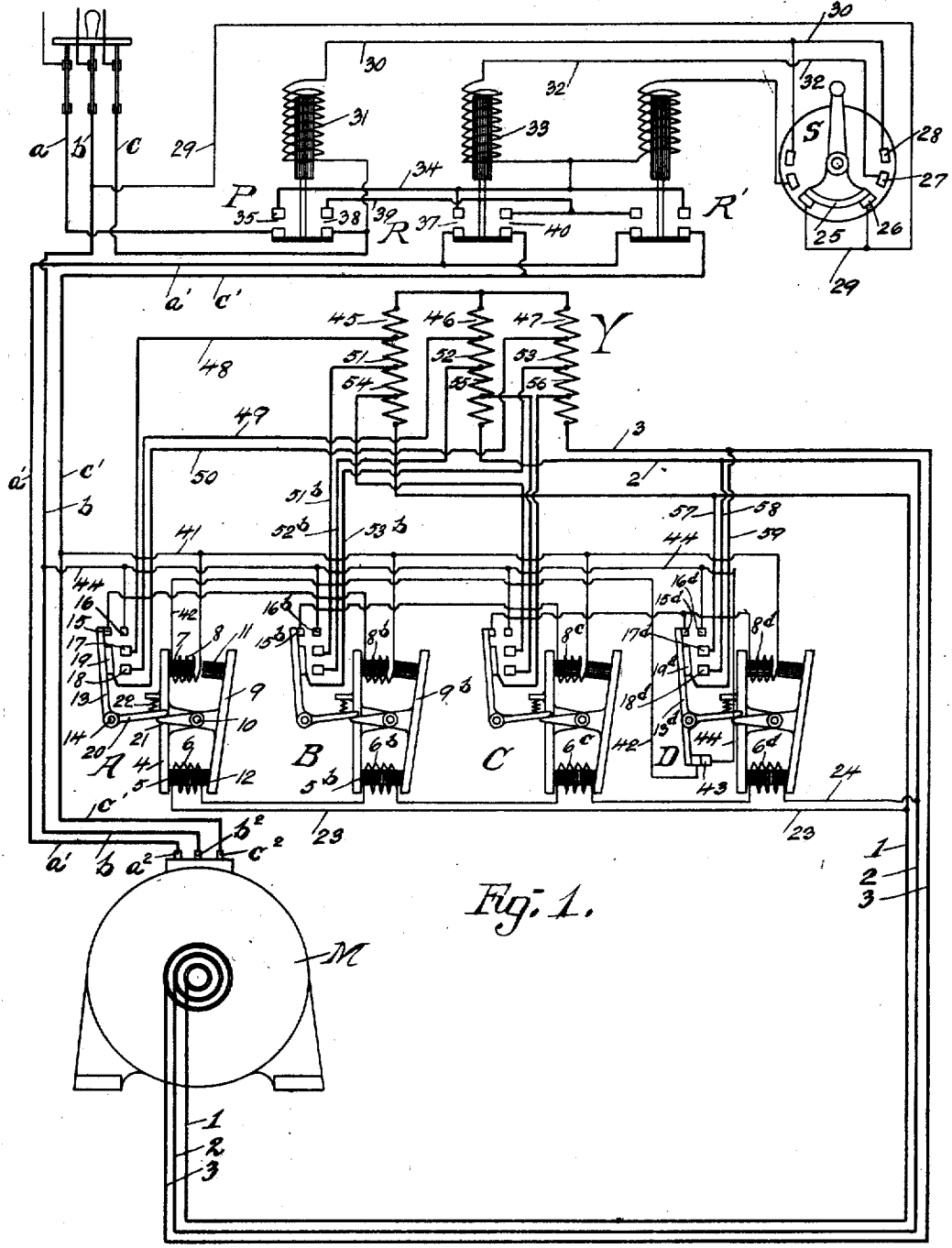

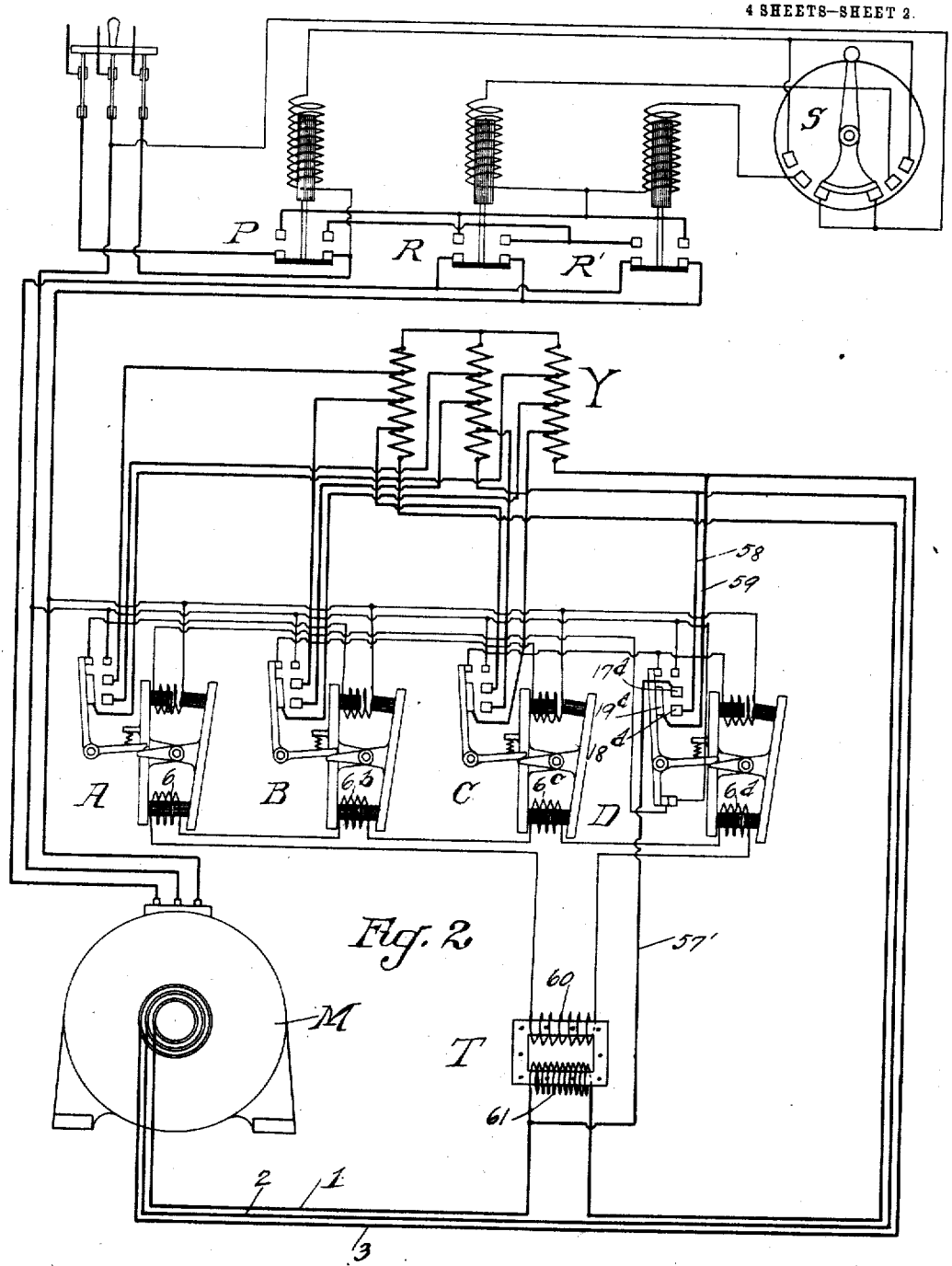

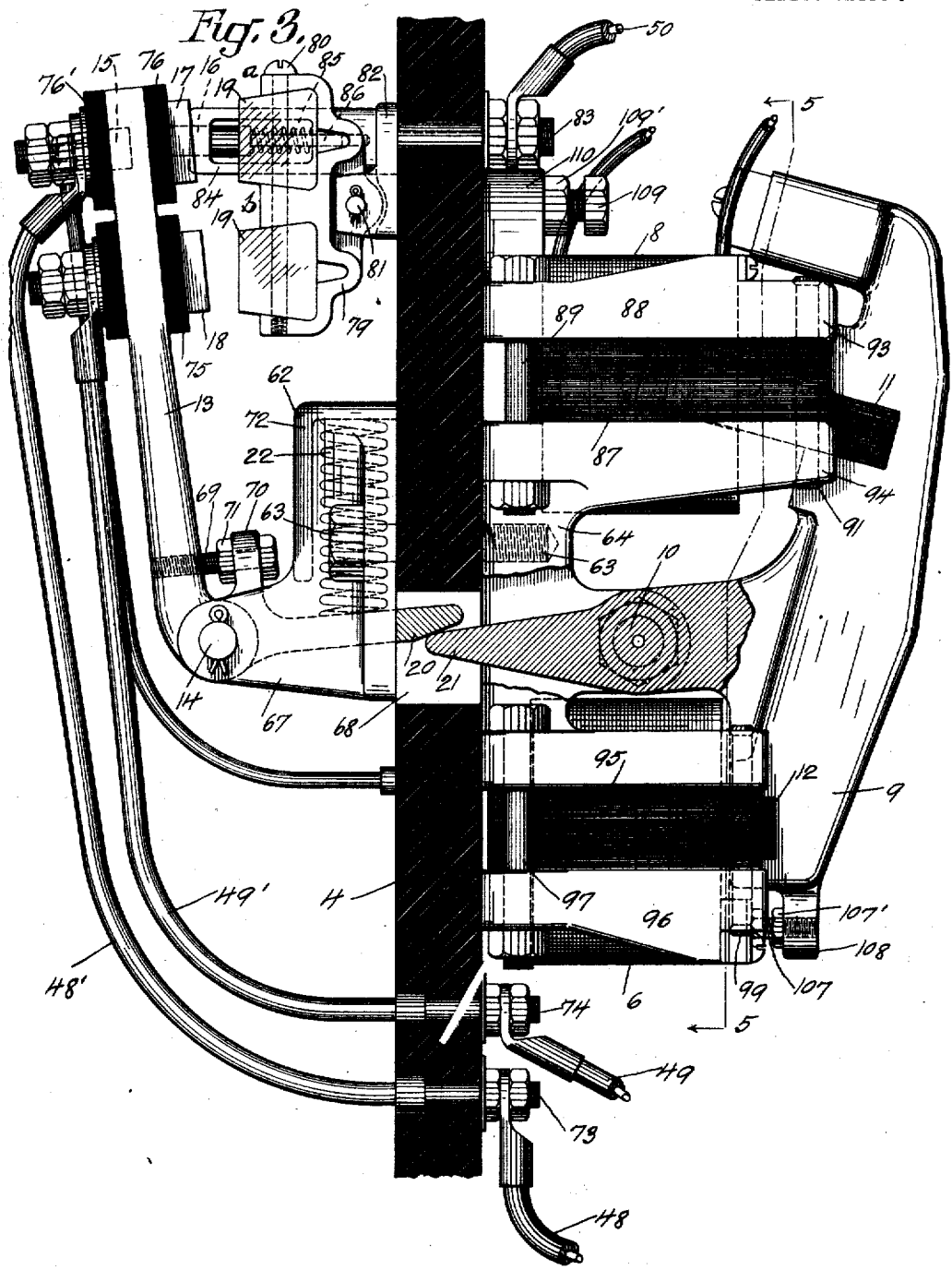

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

ALTERNATING-CURRENT-MOTOR-CONTROLLING APPARATUS.

1,012,477.      Specification of Letters Patent.      Patented Dec. 19, 1911.

Application filed October 31, 1908. Serial No. 460,508.

*To all whom it may concern:*

Be it known that I, AUGUST SUNDH, a citizen of the United States, residing at Yonkers, in the county of Westchester and State of New York, have invented a new and useful Improvement in Alternating-Current-Motor-Controlling Apparatus, of which the following is a specification.

My invention relates to alternating current motor controlling apparatus, and one of its objects is the provision of improved means for varying the starting resistance to effect gradual acceleration in the speed of the motor.

One of the specific objects of the invention is to provide improved accelerating apparatus for alternating current motors of the induction type.

Other objects of the invention will appear hereinafter, the novel combinations of elements being set forth in the appended claims.

Referring to the drawings, Figure 1 is a diagrammatic view of an alternating current induction motor and controlling mechanism therefor; Fig. 2 is a similar view showing a modification; Fig. 3 is a side elevation partly in section of an electro-magnet switch mechanism used in the control of the motor; Fig. 4 is a front elevation of the same; and Fig. 5 is a rear elevation partly in section on the line 5—5 of Fig. 3.

In Fig. 1, a three-phase induction motor M is shown adapted to receive current through the leads $a$, $b$, $c$ connected to a suitable source of current supply. The lead $b$ is connected directly to the middle binding post $b^2$ of the motor stator, and the leads $a$ and $c$ are adapted to be connected through the potential switch P, reversing switches R and R', and the leads $a'$ and $c'$ to the outer binding posts $a^2$ and $c^2$ of the stator. The rotor of the motor is connected by the three conductors 1, 2 and 3 to the outer terminals of a sectional starting resistance Y, controlled by the electro-magnetic switch devices or controllers A, B, C and D. These devices are substantially alike in most particulars and their general construction, as shown diagrammatically in Figs. 1 and 2, is as follows. The device A, for example, comprises a base 4 on which is mounted a lower electro-magnet 5 having a spool or winding 6, and an upper electro-magnet 7 having a winding 8. The armatures 12 and 11 of the two magnets are carried by a heavy lever 9 pivoted at 10 to the base 4. A switch lever 13, pivoted at 14, carries a contact 15 adapted to engage the stationary contact 16, and a bridging contact 19 adapted to bridge the stationary contacts 17 and 18. The lever 13 has a horizontal arm 20 which lies in the path of movement of an arm or cam projection 21 formed on the lever 9. A coil spring 22 tends to hold the switch lever 13 in a closed position. When the armature 12 of the magnet 5 is in its attracted position, as shown, the arm 21 holds the switch lever open and the spring 22 compressed. The lower magnet coils 6, $6^b$, $6^c$ and $6^d$ are connected in series in a circuit across two of the terminals or collector rings of the rotor so that they will all receive the same current, which will be proportional to the voltage at the collector rings. In this instance these coils are connected by conductors 23 and 24 to the conductors 1 and 2. The upper magnet coils 8, $8^b$, $8^c$ and $8^d$ are arranged to be connected in parallel circuits across two of the stator terminals, as $b$ and $c'$, and are controlled by the several switches as will fully appear in the description of the operation hereinafter. The parts are shown in their normal position of rest. To start the motor, the switch lever of the manual switch S is moved, for example, to the left, so that the segment 25 engages the stationary contacts 26, 27 and 28. This establishes a circuit through the magnet coil 31, which circuit may be traced from the lead $b$ through conductor 29, contacts 26, 25, 28, conductor 30, magnet coil 31 to the lead $c$. The magnet coil 31 therefore receives current and operates to close the switch P, thereby establishing a circuit through the magnet coil of the reversing switch R as follows: from the lead $b$ through conductor 29, contacts 26, 25, 27, conductor 32, magnet coil 33 of reversing switch R, conductor 34, and contacts 35 to the lead $a$. The magnet coil 33 lifts its core and closes the reversing switch R which connects the lead $a$ through the contacts 35, conductor 34, reversing switch contacts 37 and conductor $a'$ to the terminal $a^2$ of the motor and connects the lead $c$ through the contacts 38, conductor 39, contacts 40 and conductor $c'$ to the terminal $c^2$ of the motor. The stator now receives current and induces a current in the rotor, causing the motor to start, the current in the rotor being kept within a safe limit by the starting resistance Y which is all in circuit at this time. The lower magnet coils 6, $6^b$, $6^c$ and $6^d$ now receive current proportional to the voltage between the conductors 1 and 2. The magnet coil 8 also receives current when the reversing switch has operated, as it is connected in a circuit between the conductors $b$ and $c$ as follows: from the conductor $c$ through contacts 38, conductor 39, contacts 40, conductor $c'$, conductor 41, magnet coil 8, conductor 42, switch contacts 43, and conductor 44, to conductor $b$. The current through this circuit is substantially constant so long as the main line potential remains the same. The current through the lower magnet coils, however, gradually decreases as the speed of the motor increases. When the motor starts the strength of the magnet 5 is sufficient to hold its armature against the opposing pull of the upper magnet 7, but as the speed of the rotor increases the current through the coil 6 is gradually reduced and the magnet weakened until the upper magnet 7, aided by the spring 22, pulls its core in, permitting the switch 13 to close. The closing of the first switch short-circuits the upper sections 45, 46, 47 of the starting resistance through the conductors 48, 49, 50, connected respectively to the switch contacts 17, 18 and 19, and permits the motor to accelerate. The closing of this switch also establishes a circuit through the magnet coil $8^b$, which circuit may be traced from the conductor $b$, through conductor 44, contacts 16, 15, magnet coil $8^b$, and conductor 41 to conductor $c'$. The operation of the lever 9, as above noted, moves the armature 12 away from its magnet and thereby decreases the magnetic inductance in the coil 6 and permits an increase of current through the lower magnet coils, thus bringing back the amount of flow of current in the lower magnets to what it was when the motor started. As the speed of the motor increases, the current through these coils decreases again until the magnet $8^b$ is able to effect the operation of the switch device B. This occurs when the current through the lower magnet coils is about the same in strength as when the switch device A operated. The operation of the switch device B short-circuits the sections 51, 52, 53 through the conductors $51^b$, $52^b$, $53^b$, and also closes a circuit through the magnet coil $8^c$ by way of the contacts $15^b$ and $16^b$. The operation of the switch device B again reduces the self-induction in the lower magnet coils and permits the current to increase to a value substantially equal to what it was when the motor started. As the speed of the motor increases further, the switch device C operates and short-circuits the sections 54, 55, 56 of the starting resistance, closes a circuit through the magnet coil $8^d$, and reduces the inductance in the lower magnet coils to again effect an increase of current in the lower magnets. Finally, as the speed increases still further, the switch device D is operated. This short-circuits the entire starting resistance by connecting the conductors 1, 2 and 3 together through the conductors 57, 58 and 59 and the contacts $17^d$, $18^d$ and $19^d$, and permits the motor to attain maximum full normal speed. The operation of the switch lever $13^d$ separates the contacts 43 and thus opens the circuit through the upper magnet coil 8 and permits the weight of the lever 9 and the armatures 11 and 12 to open the switch device A. This separates the contacts 15 and 16 and opens the circuit through the magnet coil $8^b$, permitting the switch device B to be opened and in turn effect the opening of the switch device C. The circuit through the magnet coil $8^d$ remains closed, however, by reason of the holding circuit established through the contacts $15^d$ and $16^d$. The motor may now run at full normal speed with all the starting resistance short-circuited, the switch device D in its closed position and the devices A, B and C open, and no current flowing in the controlling circuits except through the magnet coil $8^d$. The circuit for the lower magnet coils is short-circuited by the bridging contact $19^d$. It will thus be seen that but little current is used in the controlling mechanism during the normal operation of the motor. As the lower magnets are each designed to operate with about the same current strength, the current through their windings only varies within comparatively narrow limits. That is, as the speed of the motor increases and the potential through the circuit of the magnet coils drops, the inductance of the circuit is decreased step by step as the magnets operate successively, so that the current strength is kept approximately uniform. This arrangement of the magnet coils in series and so that the current strength is kept up as the speed of the motor increases, forms an important feature of the present invention, as it secures a reliable and satisfactory operation of the controlling devices. These lower magnets may be considered magnetic dash-pots, as they each have a retarding action on the operation of the controllers. When the manual switch lever is moved back to central position, the circuits for the potential and reversing switch magnets are interrupted and said switches are opened to cut off all current from the motor and controlling mechanism, bringing the parts back to normal position and stopping the motor. It will be understood that the usual brake mechanism for the motor may be used if desired.

It should be noted that the operation of the controlling mechanism is practically independent of moderate variations in the main line potential, as the current strength in both the upper and lower opposing electro-magnet windings is proportional to the main line voltage. If, for example, the voltage on the main line should drop while the magnet coils 8$^b$ and 6$^b$ were receiving current, the strength of the current in the coil 8$^b$ would be reduced in the same proportion. The potential in the rotor circuits being also proportional to the main line potential, the current in the magnet coil 6$^b$ would be correspondingly reduced, so that the opposing upper and lower magnets would be weakened to the same extent and the operation of the switch device B unaffected.

In Fig. 2, the construction is substantially like that shown in Fig. 1, except that the current for the lower magnet coils 6, 6$^b$, 6$^c$, 6$^d$ is supplied by a transformer T. These coils are connected in series with the secondary winding 60 of the transformer. The primary winding 61 is connected in circuit with the conductor 1 between the rotor and the starting resistance and receives all the current flowing through the conductor 1. A conductor 57' connects the contact 17$^d$ with the conductor 1 between the motor and transformer, and when the switch device D has operated the conductors 57', 58 and 59 connect the conductors 1, 2 and 3 and short-circuit the primary of the transformer and the starting resistance. Except as above noted, the operation is the same as described in connection with Fig. 1.

In Figs. 3, 4 and 5, I have illustrated the construction of one of the electro-magnetic switches, such as A. The base 4, on which all of the switches may be mounted if desired, is made of slate or other suitable insulating material. A bracket 62 is secured to one face of the base 4 by bolts 63 which extend through the base and also form a securing means for a double frame member or casting 64 on the opposite side of the base 4 and provided with screw-threaded openings 65 to receive the threaded ends of the bolts 63. The switch lever 13 is formed with bearing lugs 66 journaled on a bearing pin 14 mounted in the arms 67 of the bracket 62. Also pivoted on the pin 14 between the lugs 66 is an arm 20 which extends into an opening 68 in the base 4. This arm is adjustably connected to the switch lever 13 for movement therewith by means of a bolt 69. This bolt extends loosely through a lug 70 formed on the arm 20, and is screw-threaded to engage a correspondingly threaded opening in the switch lever 13. A lock nut 71 serves to clamp the head of the bolt against the lug 70 and lock the bolt in adjusted position. The bracket 62 is formed with a housing 72 to receive the coil spring 22 which bears against the arm 20 and tends to close the switch. The switch lever 13 carries metallic contacts 17 and 18 insulated from the switch lever by plates or bushings 75 and 76 of insulating material. These contacts are adapted to engage a pair of carbon contacts 19$^a$ and 19$^b$ mounted in a metal holder or clamp 79 and clamped in position by a clamp bolt 80. The holder 79 is pivoted at 81 to a bracket 82 provided with an integral rod or stem 83 extending through the base and forming a binding post for the conductor 50. The contacts 17 and 18 are connected by flexible conductors 48' and 49' to the binding posts 73 and 74 for the conductors 48 and 49. The insulating plate 76' is extended as shown in Fig. 4 to form a support for the contact 15 which engages the contact 16 when the switch is closed. The contact 16 is slidably mounted in a support or holder 84 and is yieldingly held in its outward position by a coil spring 85 surrounding a stem 86 formed on the contact 16. The upper magnet comprises a body portion 87 of laminated iron clamped between the upper surface of the casting 64 and an upper casting 88. Clamping bolts 89 and 90 extending through lugs formed on the frame members, and rivets 91 and 92 extending through the laminations and through arms 93 and 94 of the frame members, serve to clamp the parts firmly in position. The construction of the lower magnet is similar, the laminated body portion 95 being clamped between the lower surface of the casting 64 and a lower frame casting 96 by means of bolts 97, 98 and rivets 99 and 100. The armature lever 9 is pivoted at 10 between lugs 101 and 102 formed on the casting 64. Screw bolts 103, 104, having conical bearing ends to fit conical bearing surfaces in the lever 9, are adjustable in said lugs to take up wear or lost motion in the bearings, and are held in adjusted position by lock nuts 105 and 106. A screw bolt 107, adjustable in a lug 108 on the lower end of the lever 9, forms a stop for the lever when in the position shown. By adjusting this stop the air gap of the lower magnet may be varied so that the device will operate at any desired speed of the motor. A lock nut 107' holds the stop in its adjusted position. An adjustable stop for the upper end of the armature lever is formed by a screw bolt 109 threaded into a lug 110 on the upper casting 88, and held in adjusted position by a lock nut 109'. This stop serves to hold the armature out of contact with its magnet and prevents sticking. The lever 9 carries upper and lower cores or armatures 11 and 12 adapted to be drawn into the upper and lower magnet spools 8 and 6, respectively. The lever 9 has an integral arm 21 which extends into the opening 68 in the base 4 in position to engage the under surface of the arm 20. It will be observed that the weight of the armature lever 9 and the armatures is nearly all on one side of the pivot and tends to swing the lower end of the lever inwardly. The lever 9 is made quite wide and massive and the weight is sufficient to compress the spring 22 and open the switch lever whenever the magnets are deënergized. The heavy armature lever arranged in this way not only permits the use of a strong enough spring 22 to effectually operate the switch lever, but also has sufficient inertia to prevent a too quick or sudden operation of each separate unit of the controller. When the upper magnet coil receives sufficient current to operate the lever 9, aided by the spring 22, the arm 21 is moved out of contact with the arm 20 so that vibrations of the armature lever due to current alternations cannot be transmitted through said arms to the switch lever. The pivoted contact holder 79 permits an equalization of the pressure between the contacts 19ª, 19ᵇ and the contacts 17, 18, so that a good electrical connection is secured.

Various changes in the details of construction and arrangement of parts might obviously be made by those skilled in the art without departing from the spirit and scope of the invention, and I wish therefore not to be limited to the exact construction disclosed.

What I claim as new and desire to secure by Letters Patent of the United States is:—

1. The combination with an alternating current motor of the induction type, of coils connected to the primary source of current, additional coils connected in series in a secondary of the motor, resistance in parallel with said additional coils in the secondary circuit, and means controlled by said coils for varying the resistance.

2. The combination with a multiphase motor of the induction type, of coils connected in parallel to the primary source of current, additional coils connected in series in a secondary circuit of the motor, starting resistance, and means controlled by said coils for varying said resistance.

3. The combination with a multiphase motor of the induction type, of coils connected in a circuit leading from the primary source of current, resistance in the secondary circuit of the motor, additional coils in series with each other in a circuit connected directly across two of the terminals of the secondary, and devices controlled and operated successively by said coils for successively cutting out sections of the starting resistance at predetermined speeds of the motor.

4. The combination with an alternating current motor of the induction type, of resistance in the secondary circuit thereof, and a plurality of electro-responsive devices for successively short-circuiting said resistances as the speed of the motor increases, said electro-responsive devices comprising single-phase coils connected to the primary and additional single-phase coils in series with each other in a circuit connected directly to two of the motor terminals.

5. The combination with an induction motor, of magnet coils in a primary circuit of the motor, opposing magnet coils arranged in series in a secondary circuit of the motor, a starting resistance in parallel with said last-named coils, and speed regulating mechanism controlled by the magnet coils.

6. The combination with an alternating current motor, of resistance in the secondary circuit of the motor, and means for controlling said resistance comprising a plurality of series-connected windings in a circuit in parallel with the resistance.

7. The combination with an alternating current motor, of starting resistance in the secondary circuit of the motor, a plurality of electro-magnets having their windings connected in series in a circuit in parallel with the resistance, and means controlled by said electro-magnets for reducing the starting resistance in the secondary circuit.

8. The combination with an alternating current motor of the induction type, of electro-magnets having their windings connected to the primary source of current, magnetically independent electro-magnets having their windings connected in series in a secondary circuit of the motor, resistance in the secondary circuit of the motor, and means dependent upon the combined action of the first and second-named electro-magnets for controlling the resistance.

9. The combination with an alternating current motor of the induction type, of starting resistance in the secondary circuit of the motor, a plurality of coils connected to receive current from the secondary of the motor, means to maintain the current in said coils approximately uniform as the speed of the motor varies, and means controlled by said coils for successively short-circuiting sections of the starting resistance.

10. The combination with an alternating current motor of the induction type, of coils connected to receive current from the motor secondary, means for preventing a substantial variation in the current in said coils as the secondary potential varies, and devices associated with said coils for controlling the acceleration of the motor.

11. The combination with an electric motor of the induction type, of coils connected to receive current from the secondary of the motor, means for reducing the impedance in the circuit or circuits of said coils approximately in proportion to the drop in voltage of said circuit or circuits as the speed of the motor increases, and starting resistance controlled by said coils.

12. The combination with an alternating current motor of the induction type, of coils connected in series in a circuit across the terminals of the motor secondary, means for varying the impedance in said circuit substantially in proportion to variations in the voltage between said terminals, and devices controlled by said coils for effecting the acceleration of the motor.

13. The combination with an alternating current motor of the induction type, of a plurality of electro-magnets having their coils connected in series in a circuit connected to receive current from the motor secondary, devices controlled by said magnets and operative successively to effect the acceleration of the motor, said magnets and coils being designed to reduce the inductance in the circuit of the coils as said devices operate and maintain an approximately uniform current in the coils as the speed of the motor increases.

14. The combination with an alternating current motor of the induction type, of a plurality of successively operable electro-magnets, means for connecting the coil of each magnet to receive current from the primary upon the operation of the preceding magnet, a plurality of electro-magnets connected in series in a circuit of the motor secondary and opposing the operation of the first-named electro-magnets, and resistance in a circuit of the motor and controlled by the operation of said electro-magnets.

In testimony whereof, I have signed my name to this specification in the presence of two subscribing witnesses.

AUGUST SUNDH.

Witnesses:
JOHN F. RULE,
JAMES G. BETHELL.